US009999201B2

United States Patent
Lutz et al.

(10) Patent No.: US 9,999,201 B2
(45) Date of Patent: Jun. 19, 2018

(54) ANIMAL COLLAR

(71) Applicant: Elive LLC, New Berlin, WI (US)

(72) Inventors: Thomas Lutz, Cedar Rapids, IA (US); Matthew Allen, Waterford, WI (US); Ernie Katris, New Berlin, WI (US)

( * ) Notice: Subject to any disclaimer, the term of this patent is extended or adjusted under 35 U.S.C. 154(b) by 109 days.

(21) Appl. No.: 14/725,970

(22) Filed: May 29, 2015

(65) Prior Publication Data

US 2015/0342149 A1    Dec. 3, 2015

Related U.S. Application Data

(60) Provisional application No. 62/031,928, filed on Aug. 1, 2014, provisional application No. 62/006,599, filed on Jun. 2, 2014.

(51) Int. Cl.
| | |
|---|---|
| *A01K 27/00* | (2006.01) |
| *A62B 35/00* | (2006.01) |
| *F21L 4/00* | (2006.01) |
| *F21V 33/00* | (2006.01) |
| *F21Y 115/10* | (2016.01) |

(52) U.S. Cl.
CPC .......... *A01K 27/006* (2013.01); *A01K 27/001* (2013.01); *F21L 4/00* (2013.01); *F21V 33/0008* (2013.01); *F21Y 2115/10* (2016.08)

(58) Field of Classification Search
CPC ..... A01K 27/006; A01K 27/00; A01K 27/001
See application file for complete search history.

(56) References Cited

U.S. PATENT DOCUMENTS

| | | | |
|---|---|---|---|
| 4,173,201 A * | 11/1979 | Chao .................... | A01K 27/006 119/859 |
| D346,482 S | 5/1994 | Merrill | |
| 5,367,987 A | 11/1994 | Lin | |
| 5,523,927 A * | 6/1996 | Gokey ................. | A01K 27/006 362/103 |
| D430,957 S | 9/2000 | Boucugnani et al. | |
| 6,283,065 B1 | 9/2001 | Shorrock et al. | |
| D456,957 S | 5/2002 | Koch | |

(Continued)

OTHER PUBLICATIONS

"Elive LED Adjustable Dog Collar". Found online Sep. 8, 2017 at amazon.com. Page dated Nov. 13, 2016. Retrieved from https://www.amazon.com/Elive-Collar-Improved-Safety-Visibility/dp/B01 FFLL Y7G/ref=cm_cr_arp_d_product_top?ie=UTF8; copy from USPTO in the related U.S. Appl. No. 29/492,712 matter.

(Continued)

*Primary Examiner* — Kristen C Hayes
(74) *Attorney, Agent, or Firm* — Michael Best & Friedrich LLP

(57) ABSTRACT

A collar for an animal includes an elongate piece of flexible material having a first end and a second end, the first and second ends configured to be releasably coupled together about the neck of an animal. The collar also includes a lighting system coupled to the piece of material. The lighting system includes a power source and an optical element coupled to the power source. The optical element is at least partially embedded within the piece of material and extends along a length direction between the first and second ends. The optical element further includes an LED that is configured to illuminate a portion of the optical element when the power source is turned on.

18 Claims, 11 Drawing Sheets

(56) References Cited

U.S. PATENT DOCUMENTS

| | | | |
|---|---|---|---|
| D516,754 S | 3/2006 | Curtis | |
| D570,237 S | 6/2008 | Goetzl | |
| 7,594,482 B1* | 9/2009 | Toplin | A01K 27/006 119/792 |
| D662,267 S | 6/2012 | Morin | |
| D687,194 S | 7/2013 | Reed | |
| 2003/0094145 A1* | 5/2003 | Cheng | A01K 27/006 119/859 |
| 2004/0252524 A1* | 12/2004 | Dacheux, Jr. | A01K 27/006 362/570 |
| 2007/0221140 A1 | 9/2007 | Warren et al. | |
| 2007/0256646 A1* | 11/2007 | Ayscue | A01K 27/006 119/859 |
| 2009/0159015 A1* | 6/2009 | Watson | A01K 27/006 119/858 |
| 2009/0283056 A1* | 11/2009 | Mattera | A01K 27/006 119/858 |
| 2013/0128555 A1* | 5/2013 | Brauser | A01K 27/006 362/108 |
| 2015/0150220 A1 | 6/2015 | Jaw | |
| 2015/0342149 A1 | 12/2015 | Lutz et al. | |

OTHER PUBLICATIONS

"Nylon Safety Collar with Blue LED Flashing Light for Dog Pet". Found on line Sep. 8, 2017 at suntekstore.com. Page dated Nov. 10, 2010. Retrieved from http://www.suntekstore.com/goods-14001379-nylon_safety_collar_with_blue_led_flashing_light_for_dog_pet.html; copy from USPTO in the related U.S. Appl. No. 29/492,712 matter.

"How's Your Dog "4-Mode" Illuminated/Glowing Nighttime Safety Dog Collar". Found online Sep. 8, 2017 at amazon.com. Page dated Jan. 16, 2010. Retrieved from https://www.amazon.com/4-Mode-Illuminated-Glowing-Nighttime-Safety/dp/B001 ZVWKZ6; copy from USPTO in the related U.S. Appl. No. 29/492,712 matter.

"Smart collars help keep an eye on your dog's health and location". Found online Mar. 2, 2016 at gizmag.com. Page dated Jul. 29, 2013. Retrieved from http://www.gizmag.com/tagg-and-whistle-pet-products/27817 /; copy from USPTO in the related U.S. Appl. No. 29/492,712 matter.

Office Action from the U.S. Patent and Trademark Office for U.S. Appl. No. 29/492,712 dated Feb. 8, 2018 (6 pages).

* cited by examiner

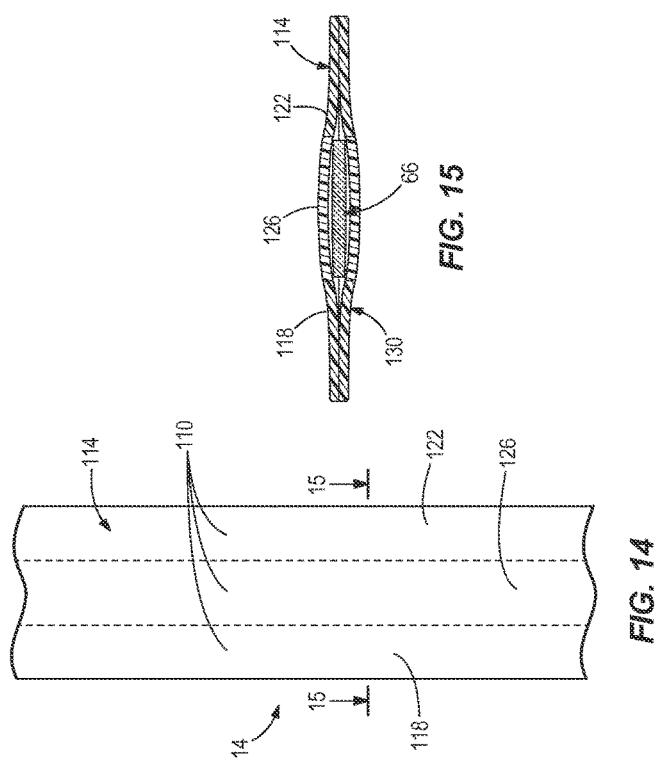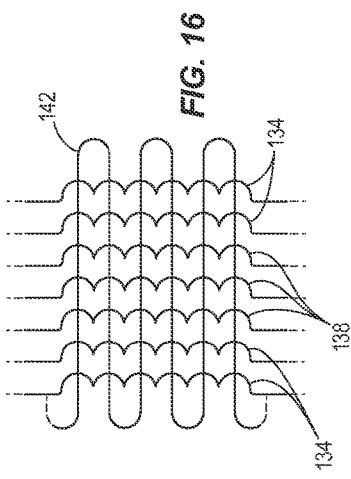

ANIMAL COLLAR

CROSS-REFERENCE TO RELATED APPLICATIONS

This application claims priority to U.S. Provisional Application No. 62/031,928, filed Aug. 1, 2014, and to U.S. Provisional Application No. 62/006,599, filed Jun. 2, 2014, the entire contents of each of which are incorporated herein by reference.

FIELD OF THE INVENTION

The present invention relates to a collar for an animal, in particular for a dog.

BACKGROUND OF THE INVENTION

Collars are commonly used on dogs. Dog collars typically include a tag attached to the collar or a name written on the collar to identify the dog, as well as a metal loop for attachment of a leash. Most dog collars also typically include a snap or buckle that fastens two ends of the collar about the neck.

SUMMARY

In accordance with one construction, a collar for an animal includes an elongate piece of flexible material having a first end and a second end, the first and second ends configured to be releasably coupled together about the neck of an animal. The collar also includes a lighting system coupled to the piece of material. The lighting system includes a power source and an optical element coupled to the power source. The optical element is at least partially embedded within the piece of material and extends along a length direction between the first and second ends. The optical element further includes an LED that is configured to illuminate a portion of the optical element when the power source is turned on.

In accordance with another construction, a collar for an animal includes an elongate piece of flexible material having a first end and a second end, the first and second ends configured to be releasably coupled together about the neck of an animal. The collar also includes a lighting system coupled to the piece of material, the lighting system including a power source coupled to the piece of material and an optical element coupled to the power source that is configured to be illuminated by the power source. The piece of material includes bands of different colors along an outer face, the outer face being a side of the collar that is exposed when the collar is worn. The bands of different colors include a first outer band of a first color, a second outer band of second color, and a third, inner band of a third color, the third color being lighter than the first and second colors. The third band is disposed adjacent the optical element.

Other aspects of the invention will become apparent by consideration of the detailed description and accompanying drawings.

BRIEF DESCRIPTION OF THE DRAWINGS

FIG. 14 is a front view of a portion of a collar according to another construction.
FIG. 15 is a cross-sectional view of the collar of FIG. 14.
FIG. 16 is a schematic view of the collar of FIG. 14.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limited.

DETAILED DESCRIPTION

FIGS. 1-16 illustrate a collar 10. While the collar 10 is illustrated in the context of a dog collar, the collar 10 may be used on various other animals, including cats or other pets.

Figure 3:
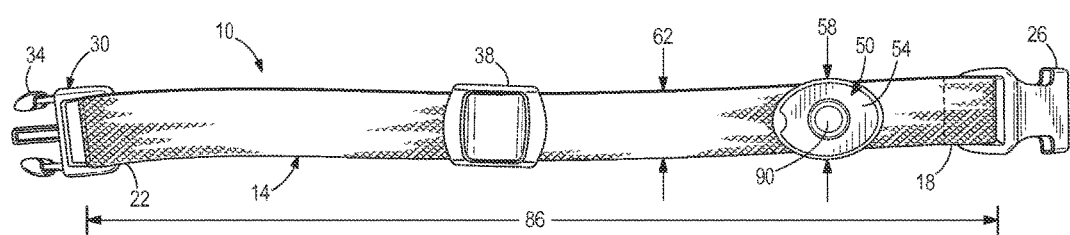
FIG. 3 is a front view of the collar of FIG. 1.

As illustrated in FIG. 3, the collar 10 includes an elongate piece of material 14 having a first end 18 and a second end 22. The illustrated piece of material 14 is a flexible, woven fabric. Other constructions use different materials (e.g., plastic) for the piece of material 14.

Figure 1:
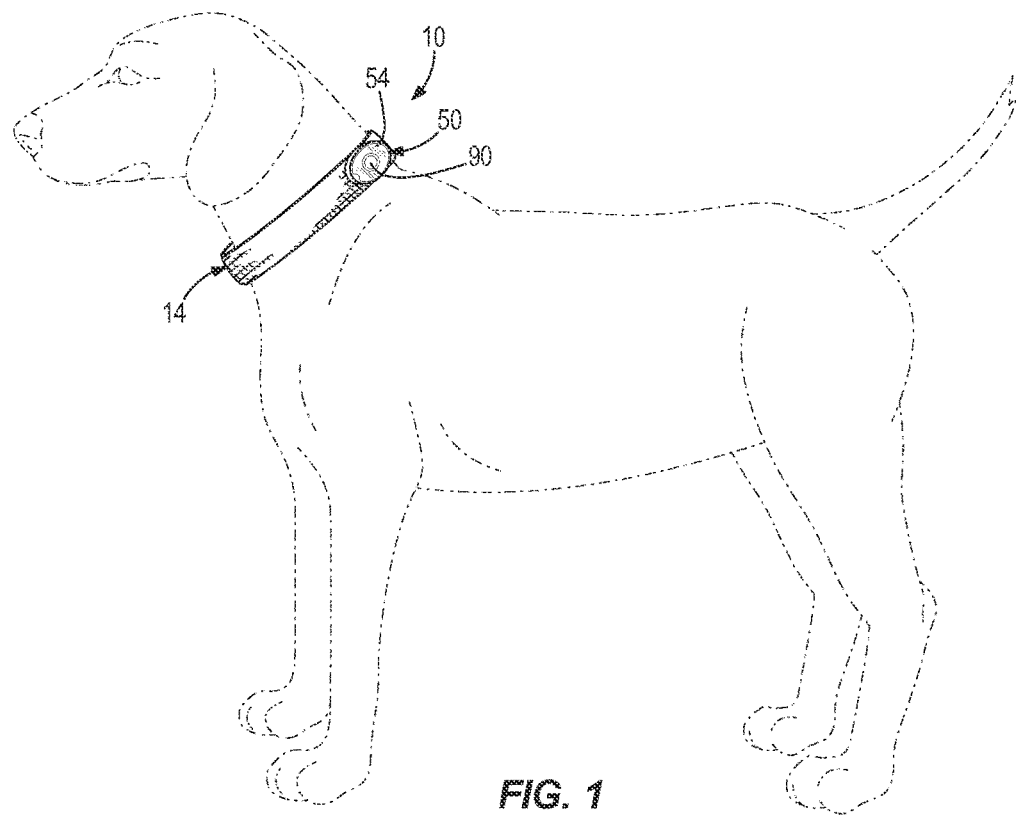
FIG. 1 is a perspective view of a collar according to one construction, shown around a dog's neck.
Figure 2:
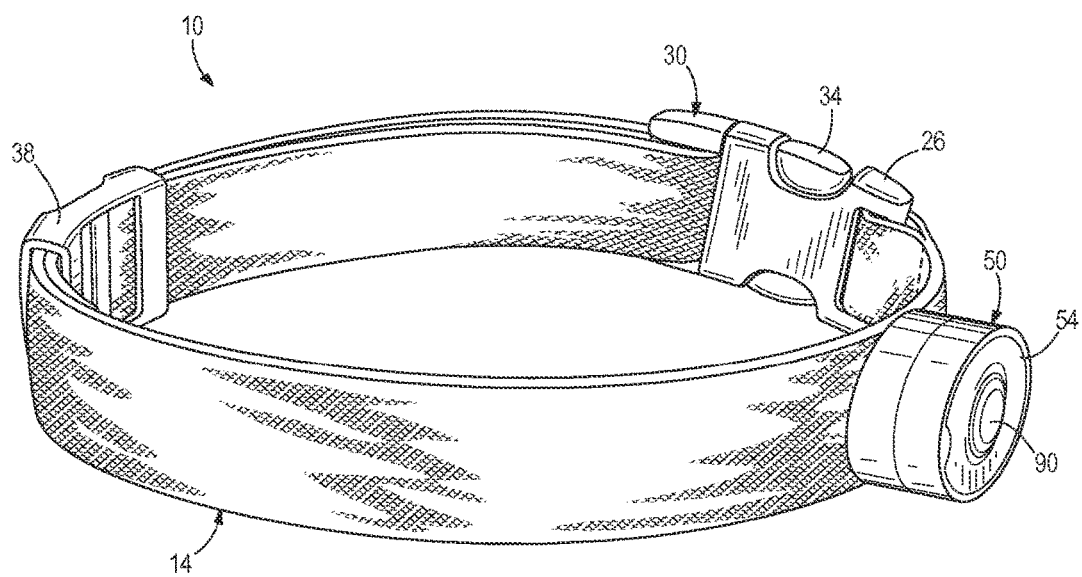
FIG. 2 is a perspective view of the collar of FIG. 1.

The collar 10 includes a first buckle portion 26 coupled to the first end 18 and a second buckle portion 30 coupled to the second end 22. The first buckle portion 26 is a female mating component, and the second buckle portion 30 is a male mating component that includes prongs 34 that releasably engage the first buckle portion 26 to couple the first and second ends 18, 22 together about the dog's neck (FIG. 1). Other constructions include different structures (e.g., snaps) for releasably coupling the first and second ends 18, 22 together.

The collar 10 also includes an adjustment mechanism 38 coupled to the piece of material 14. The illustrated adjustment mechanism 38 is a clip through which the piece of material 14 passes that allows a user to adjust an overall length of the collar 10. Other constructions include different types of adjustment mechanisms 38 (e.g., different types and sizes of clips than that illustrated). In some constructions no adjustment mechanism 38 is provided, such that the length of the collar 10 is fixed.

Figure 4:
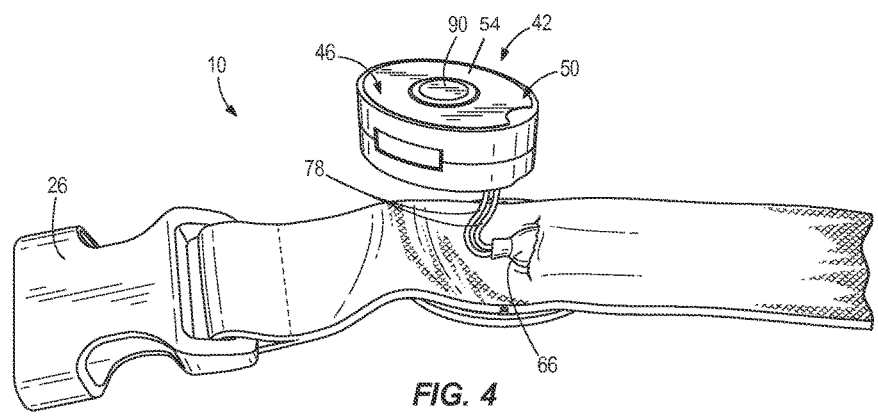
FIG. 4 is a partial, disassembled view of the collar of FIG. 1 illustrating a power button on a battery housing of the collar.
Figure 5:
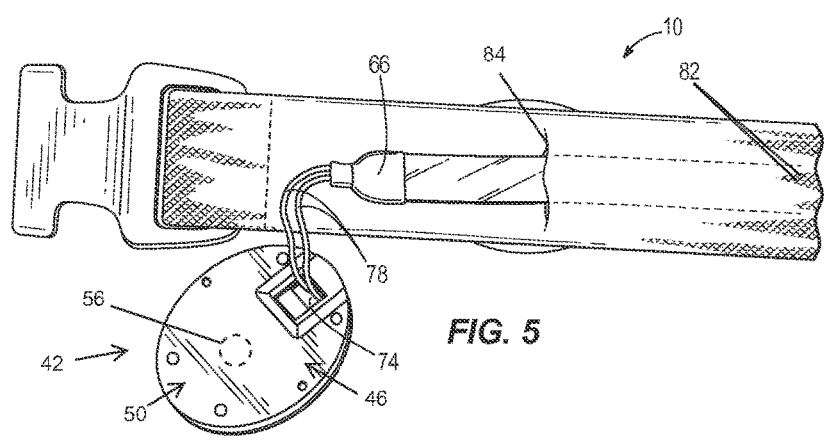
FIG. 5 is a partial, disassembled view of the collar of FIG. 1 illustrating a printed circuit board within the battery housing.
Figure 6:
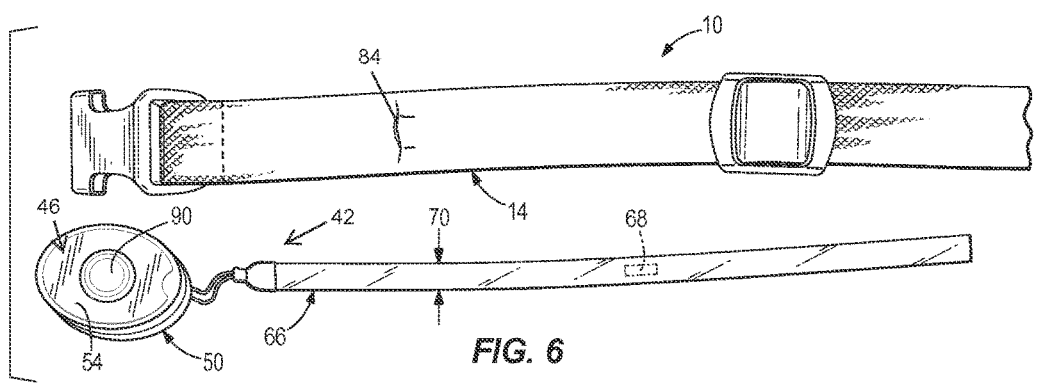
FIG. 6 is a partial, disassembled view of the collar of FIG. 1, illustrating a full length of an optical element 66 of the collar.

With reference to FIGS. 4-6, the collar 10 includes a lighting system 42 that emits light from the collar 10. The lighting system 10 includes a power source 46. In the illustrated construction the power source 46 includes a battery housing 50 with a cover 54 and a single battery 56 (FIG. 5) disposed within the battery housing 50. The illustrated battery housing 50 is generally oval in size and shape, and has a width 58 (FIG. 3) that is approximately equal to (e.g., slightly larger than) a width 62 of the piece of material 14. In some constructions a portion or portions of the battery housing 50 are coupled to the piece of material 14 (e.g., with adhesive). Other constructions include different sizes and shapes for the battery housing 50. In a preferred construction, a single battery 56 is disposed in the battery housing 50 and is a common button cell battery, such as that used in watches (e.g., a 1-3 Volt type battery). The single battery 56 by itself advantageously provides sufficient power for the lighting system 42, without the need for multiple batteries, although other constructions include different numbers and types of batteries.

With continued reference to FIGS. 4-6, the lighting system 42 further includes an optical element 66 which includes at least one light-emitting diode ("LED") 68 (FIG. 6) disposed (e.g., embedded) therein. The illustrated optical element 66 is an elongate clear plastic strip or tubular element having a width 70 (FIG. 6) that is smaller than the width 62 (FIG. 3) of the piece of material 14. The optical element 66, including the LED 68, is coupled to a printed circuit board 74 (FIG. 5) of the power source 46 via wires 78. The optical element 66 has optical properties that internally reflect and/or refract light along the optical element 66, even when the optical element 66 is bent or curved. The illustrated optical element 66 is semi-perfect and allows light to escape. The optical element 66 is embedded into the piece of material 14, so that the optical element 66 is partially or entirely hidden within the piece of material 14, and emits light through openings 82 (FIG. 5) in the woven material of the piece of material 14. To embed the optical element 66, a portion of the piece of material 14 is cut, or slit, at a location 84 (FIGS. 5 and 6) along the piece of material 14, and the optical element 66 is slid behind the portion of the piece of material 14 (e.g. between two strips of woven fabric that form the piece of material 14). Other constructions include different arrangements or methods of embedding the optical element 66. In some constructions the optical element 66 is a fiber optic cable with small openings to allow the light to escape. In some constructions the optical element 66 is a light pipe.

With reference to FIGS. 3-6, the optical element 66 extends lengthwise along the piece of material 14 between the first and second ends 18, 22. The LED 68 directs light along this lengthwise direction. The optical element 66 extends approximately half of a length 86 (FIG. 3) of the piece of material 14, so that during use when the collar 10 is coupled to the neck of an animal, the optical element 66 extends approximately 180 degrees around the animal's neck, in a front-facing region of the neck below the animal's jaw. Of course, other constructions may include optical elements 66 that extend completely around the collar or that extend different lengths than illustrated and described herein. In addition, some constructions may include optical elements that include dark regions that provide a broken light effect with two or more separated light strips.

The optical element 66 provides light through use of one, or more than one, LED 68 within the optical element 66. In preferred constructions a single LED 68 is used to emit light through the optical element 66. The use of a single LED 68 requires little battery power, thereby allowing a single battery to provide the necessary power. The light emitted from the LED 68 or LEDs 68 travels along the optical element 66 in a circumferential direction around the dog's neck, lighting up a portion of the collar 10 and emitting light away from the dog's neck. The use of an LED 68, coupled with the optical element 66, provides excellent light dispersion/bending around the collar 10 and low electrical cost. This provides both a uniform band of light as well as reduced battery drain.

With reference to FIGS. 1-4 and 6, the lighting system 42 also includes a power button 90 that activates and deactivates the optical element 66 (e.g., activates and deactivates the LED 68 within the optical element 66). The power button 90 is a push-button disposed generally in a center of the cover 54, opposite the printed circuit board 74 and wires 70. In use, when the power button 90 is pressed a first time the optical element 66 illuminates. When the power button 90 is pressed a second time the optical element 66 turns off. Other constructions include other types and locations for the power button 90, as well as other processes or steps for activating and deactivating the optical element 66. In some constructions, the collar 10 includes a remote sensor that detects activation from a remote control to allow remote activation of the optical element 66. RF, IR or other suitable remote control schemes are possible. In still other constructions, the collar 10 is formed in conjunction with a shock or training collar to allow remote activation using the same remote control as is used for training purposes. In some constructions the collar 10 includes a light sensor that activates the optical element 66 in the collar 10 when ambient light drops below a predefined intensity.

Figure 7:
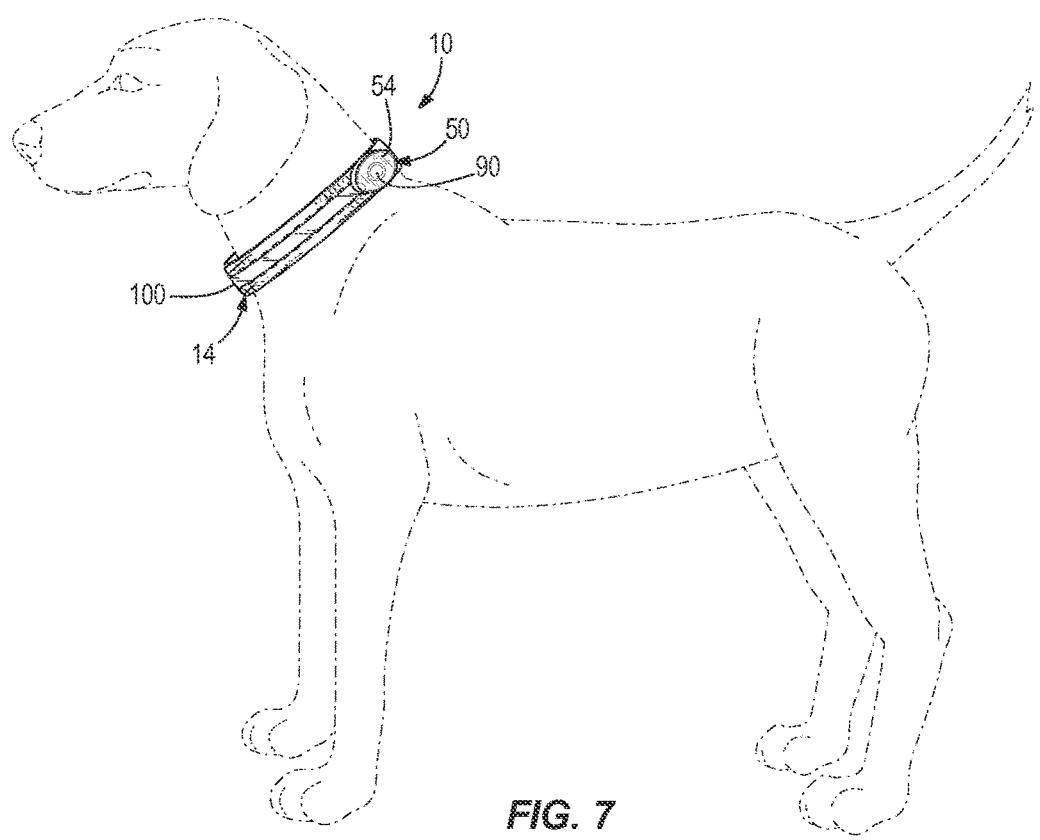
FIG. 7 is a perspective view of a collar according to another construction, shown around a dog's neck.
Figure 8:
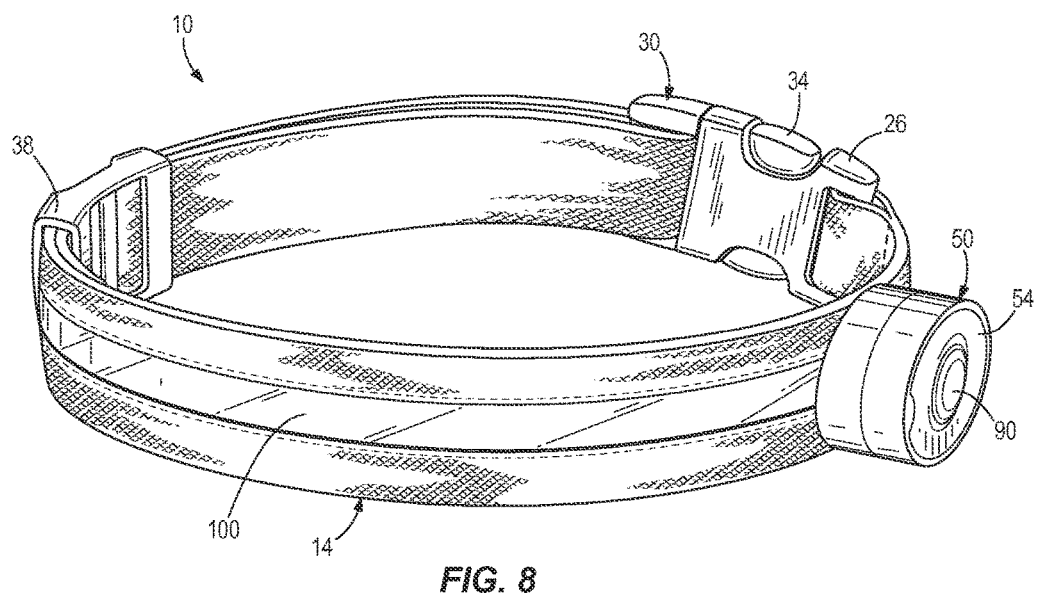
FIG. 8 is a perspective view of the collar of FIG. 7.
Figure 9:
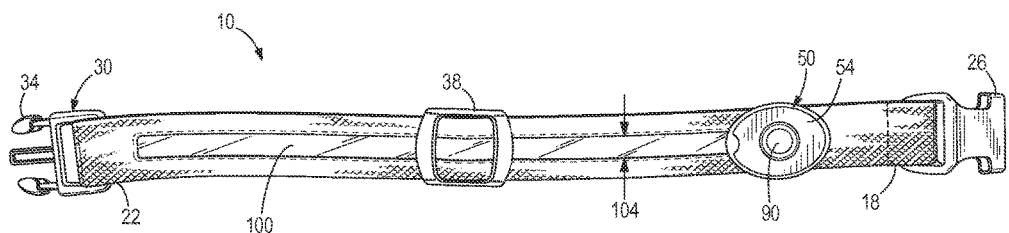
FIG. 9 is a front view of the collar of FIG. 7.
Figure 10:
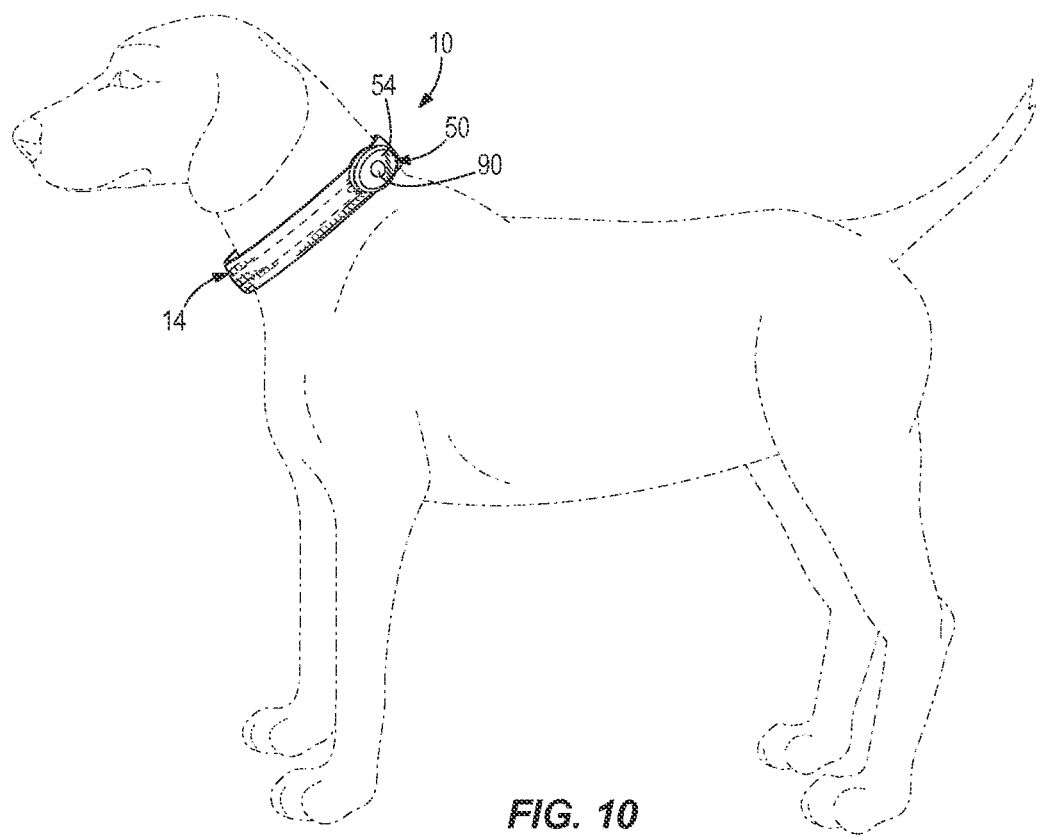
FIG. 10 is a perspective view of the collar of FIG. 7 shown around a dog's neck, illustrating a different battery housing.
Figure 11:
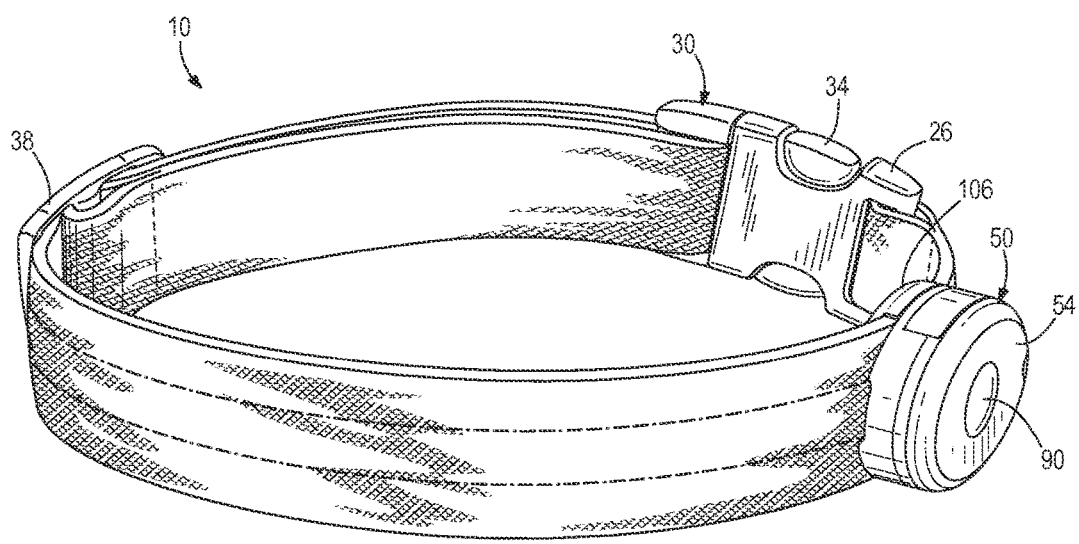
FIG. 11 is a perspective view of the battery housing of FIG. 10.
Figure 12:
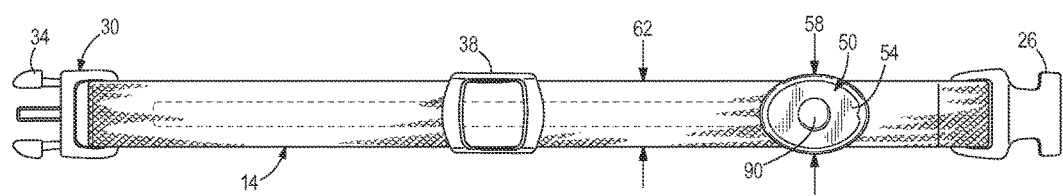
FIG. 12 is a front view of the battery housing of FIG. 10.
Figure 13:
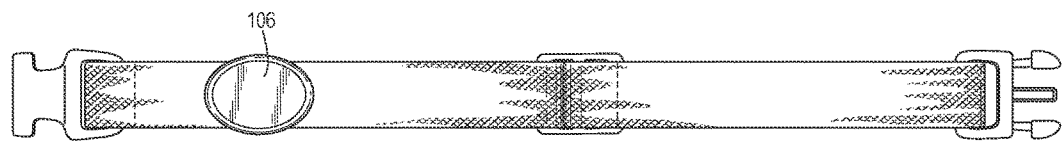
FIG. 13 is a back view of the battery housing of FIG. 10.

With reference to FIGS. 7-9, in some constructions the piece of material 14 includes a transparent (e.g., fully transparent or semi-transparent) strip 100. The optical element 66 is embedded within the piece of material 14 behind or underneath the strip 100, so that light emitted from the optical element 66 passes through the strip 100. In the illustrated construction the strip 100 is a woven plastic strip surrounded by woven fabric. The strip 100 provides added light transmission capability to the collar 10, thereby further reducing the battery power required and/or increasing the intensity of the light emitted from the collar 10.

With reference to FIG. 7, the strip 100 extends approximately half of the length 86 of the piece of material 14, so that during use when the collar 10 is coupled to the neck of an animal, both the strip 100 and the optical element 66 underneath the strip 100 extend approximately 180 degrees around the animal's neck, in a front-facing region of the neck below the animal's jaw. With reference to FIG. 9, the strip 100 also has a width 104 substantially equivalent to the width 70 (FIG. 6) of the optical element 66. Other constructions include different shapes and sizes for the strip 100.

With reference to FIGS. 10-13, in some constructions the collar 10 includes a back portion 106 (FIGS. 11 and 13) that at least partially covers the piece of material 14 behind the battery housing 50, such that the piece of material 14 passes between the battery housing 50 and the back portion 106. The illustrated back portion 106 is a separate piece of material coupled to the piece of material 14 (e.g., with adhesive). In some constructions the back portion 106 is coupled to the battery housing 50 without being fixedly attached to the piece of material 14. In some constructions the back portion 106 is integrally formed as one piece with at least a portion of the battery housing 50. In some constructions the back portion 106 is coupled to the battery housing 50 with fasteners or other structures, or is coupled to the piece of material 14 via a friction fit.

With reference to FIGS. 14-16, in some constructions the elongate piece of material 14 includes bands 110 of different color along an outer face 114 of the collar, the outer face 114 being a side of the collar 10 that is exposed when the collar 10 is worn. For example, and with reference to FIG. 14, in some constructions the elongate piece of material 14 includes a first outer band 118 of dark color (e.g., dark green, black, etc.), a second outer band 122 of dark color (e.g., dark green, black, etc.), and a third inner band 126 of lighter or moderate color (e.g., light yellow, yellow, light orange, orange, etc.) disposed between the first and second bands 118, 122. Of course, other constructions include various other colors, darknesses of colors, numbers of bands, and arrangements of bands 110, to provide different aesthetics to the outer face 114. In some constructions the collar 10 includes just a single band 126 (e.g., light colored) extending across the entire collar 10.

With reference to FIG. 15, in the illustrated construction the third, light-colored band 126 is disposed directly above and adjacent the embedded optical element 66. The elongate piece of material 14 also includes an inner face 130, which in conjunction with the outer face 114, embeds the optical element 66.

With reference to FIG. 16, the outer face 114 is comprised of various layers and types of fabric (e.g., thread, yarn, fiber, etc.). In particular, the outer face 114 includes a first type of fabric 134 (e.g., a dark green fabric) that is used for the first and second bands 118, 122. The outer face 114 also includes a second type of fabric 138 (e.g., a light yellow fabric, etc.) that is used for the third band 126. The first and second types of fabric 134, 138 are woven or otherwise formed generally vertically (i.e., along an elongated length of the collar 10) as shown in FIG. 16.

The outer face 114 also includes a third type of fabric 142 that is disposed beneath the first and second types of fabric 134, 138. The third type of fabric 142 is woven or otherwise formed generally horizontally (i.e., along a width of the collar 10), in a direction transverse to the first and second types of fabric 134, 138. In the illustrated construction the third type of fabric 142 is a clear plastic thread. The clear plastic thread facilitates transmission of light from the embedded optical element 66 into and through the third band 126. In other constructions the third type of fabric 142 is a white or other very light colored fabric, or any other type of fabric that facilitates transmission of light. The use of the third type of fabric 142 facilitates transmission of light through various colors of fabrics, yet still permits darker fabrics (e.g., dark green, black, etc.) to be used for the outer first and second bands 118, 122.

In some constructions the inner face 136 also has the same construction of layers, bands, and fabrics as the outer face 114 described above, such that the collar may be switched and worn inside out with the same capability to transmit light.

Although the invention has been described in detail with reference to certain preferred embodiments, variations and modifications exist within the scope and spirit of one or more independent aspects of the invention as described.

What is claimed is:

1. A collar for an animal, the collar comprising:
    an elongate piece of flexible material having a first end and a second end, the first and second ends configured to be releasably coupled together about the neck of an animal; and
    a lighting system coupled to the piece of material, the lighting system including a power source and an optical element coupled to the power source, wherein the optical element is at least partially embedded within the piece of material and extends along a length direction between the first and second ends, wherein the optical element further includes an LED, and wherein the LED is configured to illuminate a portion of the optical element when the power source is turned on;
    wherein the piece of material includes bands of different colors along an outer face, the outer face being a side of the collar that is exposed when the collar is worn, wherein the bands of different colors include a first outer band of a first color, a second outer band of second color, and a third, inner band of a third color, the third color being lighter than the first and second colors, wherein the third band is disposed directly above the optical element;
    wherein the first and second outer bands are each formed from woven fabric and each extend along the length direction between the first and second ends of the piece of material, wherein the first and second outer bands are each formed from a first type of fabric and the third inner band is formed from a second type of fabric.

2. The collar of claim 1, wherein the power source includes a battery housing coupled to the piece of material.

3. The collar of claim 2, wherein the power source includes a circuit board disposed within the battery housing and wiring extending from the circuit board, wherein the wiring couples the circuit board to the optical element.

4. The collar of claim 2, wherein the lighting system includes a power button disposed on the battery housing that when pressed activates and illuminates the optical element.

5. The collar of claim 2, wherein the power source includes only a single battery disposed within the battery housing.

6. The collar of claim 1, wherein the optical element includes an elongate clear plastic strip.

7. The collar of claim 1, wherein the optical element has a width that is smaller than a width of the piece of material.

8. The collar of claim 1, wherein the piece of material includes openings, and wherein the optical element is configured to emit light through the openings.

9. The collar of claim 1, wherein the piece of material includes two strips of woven fabric, wherein one of the two strips includes the first, second, and third bands, and wherein at least a portion of the optical element is disposed between the two strips of woven fabric.

10. The collar of claim 1, wherein the LED directs light through the optical element along the length direction.

11. The collar of claim 1, wherein the optical element extends approximately half of a length of the piece of material, so that when the collar is coupled to the neck of an animal, the optical element extends approximately 180 degrees around the animal's neck in a front-facing region of the neck below the animal's jaw.

12. The collar of claim 1, wherein the piece of material includes a transparent strip directly below the second band, and wherein the optical element is disposed directly below the transparent strip.

13. The collar of claim 12, wherein the transparent strip has a width that is substantially equivalent to a width of the optical element.

14. The collar of claim 1, wherein the outer face further includes a third type of fabric that is disposed beneath the first and second types of fabric, wherein the third type of fabric is woven along a width direction of the piece of material that transverse to the length direction.

15. A collar for an animal, the collar comprising:
an elongate piece of flexible material having a first end and a second end, the first and second ends configured to be releasably coupled together about the neck of an animal; and
a lighting system coupled to the piece of material, the lighting system including a power source coupled to the piece of material and an optical element coupled to the power source that is configured to be illuminated by the power source;
wherein the piece of material includes bands of different colors along an outer face, the outer face being a side of the collar that is exposed when the collar is worn, wherein the bands of different colors include a first outer band of a first color, a second outer band of second color, and a third, inner band of a third color, the third color being lighter than the first and second colors, wherein the third band is disposed adjacent the optical element;
wherein the first and second outer bands are each formed from woven fabric and each extend along a length direction between the first and second ends of the piece of material, wherein the first and second outer bands are each formed from a first type of fabric and the third inner band is formed from a second type of fabric.

16. The collar of claim 15, wherein the outer face further includes a third type of fabric that is disposed beneath the first and second types of fabric, wherein the third type of fabric is woven along a width direction of the piece of material that transverse to the length direction.

17. The collar of claim 16, wherein the third type of fabric is a clear plastic material.

18. A collar for an animal, the collar comprising:
an elongate piece of flexible material having a first end and a second end, the first and second ends configured to be releasably coupled together about the neck of an animal; and
a lighting system coupled to the piece of material, the lighting system including a power source coupled to the piece of material and an optical element coupled to the power source that is configured to be illuminated by the power source;
wherein the piece of material includes bands of different colors along an outer face, the outer face being a side of the collar that is exposed when the collar is worn, wherein the bands of different colors include a first outer band of a first color, a second outer band of second color, and a third, inner band of a third color, the third color being lighter than the first and second colors, wherein the third band is disposed adjacent the optical element, wherein the outer face further includes a clear plastic woven fabric material that is disposed beneath the bands of different colors.

\* \* \* \* \*